US011932554B2

United States Patent
Smith

(10) Patent No.: US 11,932,554 B2
(45) Date of Patent: Mar. 19, 2024

(54) METHOD OF RECOVERING HIGH NICKEL CONTENT CATHODE MATERIAL FROM RECYCLED LITHIUM ION AND NICKEL METAL HYDRIDE BATTERIES

(71) Applicant: American Hyperform, Inc., Philadelphia, PA (US)

(72) Inventor: William Novis Smith, Philadelphia, PA (US)

(73) Assignee: American Hyperform, Inc., Philadelphia, PA (US)

( * ) Notice: Subject to any disclaimer, the term of this patent is extended or adjusted under 35 U.S.C. 154(b) by 0 days.

(21) Appl. No.: 18/121,762

(22) Filed: Mar. 15, 2023

(65) Prior Publication Data

US 2023/0322578 A1   Oct. 12, 2023

Related U.S. Application Data

(60) Provisional application No. 63/329,531, filed on Apr. 11, 2022.

(51) Int. Cl.
*H01M 10/0525*   (2010.01)
*C01G 51/00*   (2006.01)
(Continued)

(52) U.S. Cl.
CPC .......... *C01G 51/50* (2013.01); *H01M 4/0471* (2013.01); *H01M 4/0492* (2013.01); *H01M 4/525* (2013.01); *H01M 10/0525* (2013.01); *H01M 10/54* (2013.01); *C01P 2006/40* (2013.01); *H01M 2004/028* (2013.01)

(58) Field of Classification Search
None
See application file for complete search history.

(56) References Cited

U.S. PATENT DOCUMENTS 2,740,522 A   4/1956   Aimone et al.
2,801,153 A   7/1957   Dwyer
(Continued)

FOREIGN PATENT DOCUMENTS

CN   101871048 B   5/2012
CN   105206889 B   10/2018
(Continued)

OTHER PUBLICATIONS

U.S. Appl. No. 17/890,314, Smth.

*Primary Examiner* — Wyatt P McConnell
(74) *Attorney, Agent, or Firm* — Blanchard Horton PLLC

(57) ABSTRACT

A more efficient and lower cost method for producing electrochemically stable, and thus safe from thermal runaway, high electrochemical capacity coated lithium nickelate is disclosed. The coated nickelate hydroxide particles are formed from a mixed metal sulfate solution (MMS) serving as the starting material that is obtained from recycled lithium ion and/or nickel metal hydride batteries. The coating of the particles includes a relatively small amount of cobalt/manganese oxide forming the surface of the nickelate particles, while the core of the particles includes a relatively large amount of nickel in relation to the weight of the coating. Battery cathode electrodes may be manufactured by using the obtained coated lithium nickelate particles as the cathode active material (CAM) in forming the battery cathodes.

63 Claims, 2 Drawing Sheets

(51) Int. Cl.
  *H01M 4/04* (2006.01)
  *H01M 4/525* (2010.01)
  *H01M 10/54* (2006.01)
  *H01M 4/02* (2006.01)

(56) References Cited

U.S. PATENT DOCUMENTS

| | | | |
|---|---|---|---|
| 4,289,613 | A | 9/1981 | Goodman et al. |
| 4,360,425 | A | 11/1982 | Lim et al. |
| 6,120,927 | A | 9/2000 | Hayashi |
| 7,458,419 | B2 | 12/2008 | Nold, III et al. |
| 7,713,313 | B1 | 5/2010 | Smith et al. |
| 7,829,223 | B1 | 11/2010 | Smith et al. |
| 8,246,717 | B1 | 8/2012 | Smith et al. |
| 8,252,085 | B1 | 8/2012 | Smith et al. |
| 8,696,788 | B1 | 4/2014 | Smith et al. |
| 10,246,343 | B2 | 4/2019 | Chow et al. |
| 10,919,046 | B2 | 2/2021 | Kochhar et al. |
| 11,316,208 | B2 | 4/2022 | Smith |
| 2011/0250499 | A1* | 10/2011 | Hiratsuka ............ H01M 4/525 429/223 |
| 2015/0040685 | A1 | 2/2015 | Nicholson |
| 2016/0045841 | A1 | 2/2016 | Kaplan |
| 2020/0078796 | A1 | 3/2020 | Kochhar et al. |
| 2020/0407237 | A1* | 12/2020 | Bourassa ............ B01D 61/423 |
| 2021/0078012 | A1 | 3/2021 | Kochhar et al. |
| 2021/0078013 | A1 | 3/2021 | Kochhar et al. |
| 2021/0079495 | A1 | 3/2021 | Harris et al. |
| 2022/0013815 | A1 | 1/2022 | Smith |
| 2023/0335815 | A1 | 10/2023 | Smith |

FOREIGN PATENT DOCUMENTS

| | | |
|---|---|---|
| CN | 111129632 A | 7/2021 |
| WO | 2017091562 A1 | 6/2017 |
| WO | 2022010975 A1 | 1/2022 |

\* cited by examiner

METHOD OF RECOVERING HIGH NICKEL CONTENT CATHODE MATERIAL FROM RECYCLED LITHIUM ION AND NICKEL METAL HYDRIDE BATTERIES

REFERENCE TO RELATED APPLICATIONS

This application claims the benefit of U.S. Provisional Application No. 63/329,531 entitled "Method of Recovering High Nickel Content Cathode Material from Recycled Lithium Ion and Nickel Metal Hydride Batteries" filed Apr. 11, 2022, which is incorporated by reference in its entirety.

BACKGROUND

Lithium based batteries are widely used in all major applications for rechargeable and many non-rechargeable battery applications including automotive vehicles, mobile electronic devices, uninterruptable power supplies, robotic devices, and many more. A rechargeable lithium-ion battery depends on a cathode (positive electrode) containing foil-coated powders of lithium metal oxide. The lithium metal oxide is conventionally provided as a lithium cobaltate; a mixture of nickel, manganese, and cobalt in various ratios (NMC); or a lithium iron phosphate. These different lithium cathode materials have different electrical and processing characteristics and vary in cost.

Although lithium-ion batteries have the highest energy density (Wh/kg) of currently used rechargeable batteries, there is ongoing demand to increase their energy density. For example, increasing the battery energy density of a lithium-ion battery increases the driving range for electrical cars, allows smaller batteries in mobile phones, and thus increase the range or use time of all devices dependent on battery power.

Presently, the highest energy densities for lithium-ion batteries are achieved with a lithium nickelate cathode materials system. However, while providing the highest theoretical energy density, the use of pure lithium nickelate ($LiNiO_2$) has several disadvantages: 1) lithium nickelate has a lower discharge/charge rate compared to other lower energy density lithium cathode materials; 2) the surfaces of the lithium nickelate particles forming the cathode are reactive with organic electrolytes, which causes increased loss of cell/battery capacity on charge/discharge cycling and the resultant loss of useful battery life, and 3) batteries containing pure lithium nickelate cathodes have a greater susceptibility to thermal run away (fire) and are thus not considered safe.

In an attempt to overcome these disadvantages while safely achieving the maximum nickel content, and therefore the maximum energy density cathode material for lithium-ion batteries while increasing the power (discharge/discharge rate) and stabilizing the cathode surface to increase charge/discharge cycle life, conventional techniques have added or co-precipitated 10-30% cobalt, 10-30% manganese, and/or up to 20% alumina with nickel hydroxide to produce a mixed hydroxide/oxide starting material for preparing a lithium nickelate material diluted with cobalt NC (lithium nickelate cobalt), diluted with cobalt and aluminate NCA (lithium nickel cobalt aluminate), or diluted with manganese and cobaltate NMC (lithium nickel manganese cobaltate). However, these dilution techniques rely on high-cost virgin metal compounds to form the diluted lithium nickelate cathode material.

Argonne National Laboratories developed a gradient precipitation process for varying the manganese or cobalt throughout coprecipitated nickel/manganese/cobalt hydroxide particles, which are then dried and furnaced with lithium carbonate or lithium hydroxide to form lithium nickelate diluted with manganese and cobalt (NMC) cathode materials at >900° C. This process desirably concentrates the cobalt and manganese more toward the surface of the NMC particles for more effective protection of the lithium nickelate particle. This allows an increase in the amount of nickel in the cathode particle with a reduction in the amount of cobalt and manganese needed for safety. However, this process is complex, requires relatively large amounts of cobalt and manganese in relation to the desired nickel, and relies on high-cost virgin metal compounds.

Another conventional approach to overcome the disadvantages of pure lithium nickelate is to reduce the nickel content to 33%-60% by weight and add manganese and cobalt for the balance of the cathode materials to produce a NMC lithium cathode material. In these cases, the nickel-containing mixed metal hydroxides are milled with lithium carbonate or lithium hydroxide and then furnaced up to about 900° C. for over 10 hours and then cooled and ground to a particle size below −30 microns. 3M has developed a process where the mixture of lithium hydroxide solid or lithium carbonate is ball milled for many hours with the desired metal oxide (mixed or precipitated nickel and cobalt and manganese oxides or hydroxides) and then this ball-milled mixture is furnaced and ground. However, this approach is complex, requires relatively large amounts of cobalt and manganese in relation to the desired nickel content, and relies on high-cost virgin metal compounds.

There are many variations on these described processes. For example, U.S. Pat. No. 7,829,223 to Smith et al. describes a process in which a mix of 80% nickel hydroxide and 20% cobalt hydroxide powders is stirred and reacted in an aqueous slurry with lithium hydroxide at 100°-200° C. for 3-4 hours. The water is then removed to yield a dry free flowing powder, which is the formed fully reacted partial hydrates of lithium nickelate (LiNiOOH) and lithium cobaltate (LiCoOOH). This dry mix is furnaced in air at 730° C. for two hours, to produce a stable lithium cobalt nickelate (NC) cathode material, which requires only slight milling. The XRD of this material showed only slight crystallinity, indicating a nano-crystalline lithium cathode material. These lithium nickelate and lithium cobalt materials exhibited significant stability on cycling and are capable of being discharged to 2 V and then recharged back to full capacity without capacity loss, while normal lithium cathode materials cannot be discharged below 2.8 V without serious loss of capacity. The materials also exhibited very low (−40° C.) full capacity discharge rates over one hour (1 C rate). Smith et al. (U.S. Pat. No. 7,713,313) also described the preparation of nano-crystalline lithium manganate cathode materials using a similar procedure. A disadvantage of these variations is that relatively large amounts of manganese and cobalt are needed in relation to the nickel.

As can be seen from the above description, there is an ongoing need for simple and efficient materials and methods to produce lithium-ion battery cathodes from recycled battery materials. The materials and methods of present invention overcome at least one of the disadvantages associated with conventional materials and methods.

SUMMARY

In one aspect, the invention provides a method comprising preparing lithium nickel manganese cobaltate material for use in lithium batteries as a cathode active material, where the method comprises converting metal sulfates in a mixed metal sulfate solution to metal hydroxides with a hydroxide until a solution pH from 10 to 11 is reached to produce a slurry; filtering the slurry to produce a filtrate; washing the filtrate; lithiating the filtrate with an aqueous lithium salt slurry to produce a mixture; removing water from the mixture to produce a dried material; initially milling and screening the dried material until the dried material passes through a −100 to −500 screen; furnacing the dried material above 700 degrees Celsius for 0.5 to 4 hours in the presence of oxygen to produce a LiNixMnyCozO2 material; and secondarily milling and screening the LiNixMnyCozO2 material until the LiNixMnyCozO2 material is from −30 to −70 microns to produce the lithium nickel manganese cobaltate material.

In another aspect of the invention, there is a method for lithiating commercially available nickel hydroxide into a nano-crystalline lithium nickelate for use in lithium batteries as a cathode active material, where the method comprises lithiating nickel hydroxide particles with an aqueous lithium salt slurry to produce a mixture; removing water from the mixture to produce a dried material; initially milling and screening the dried material until the dried material passes through a −30 to −160 micron screen; furnacing the dried material above 700 degrees Celsius for 0.5 to 4 hours in the presence of oxygen to produce a LiNiO2 material; and secondarily milling and screening the LiNiO2 material until the LiNiO2 material is from −30 to −70 microns to produce the nano-crystalline lithium nickelate.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description.

DETAILED DESCRIPTION

Figure 1:
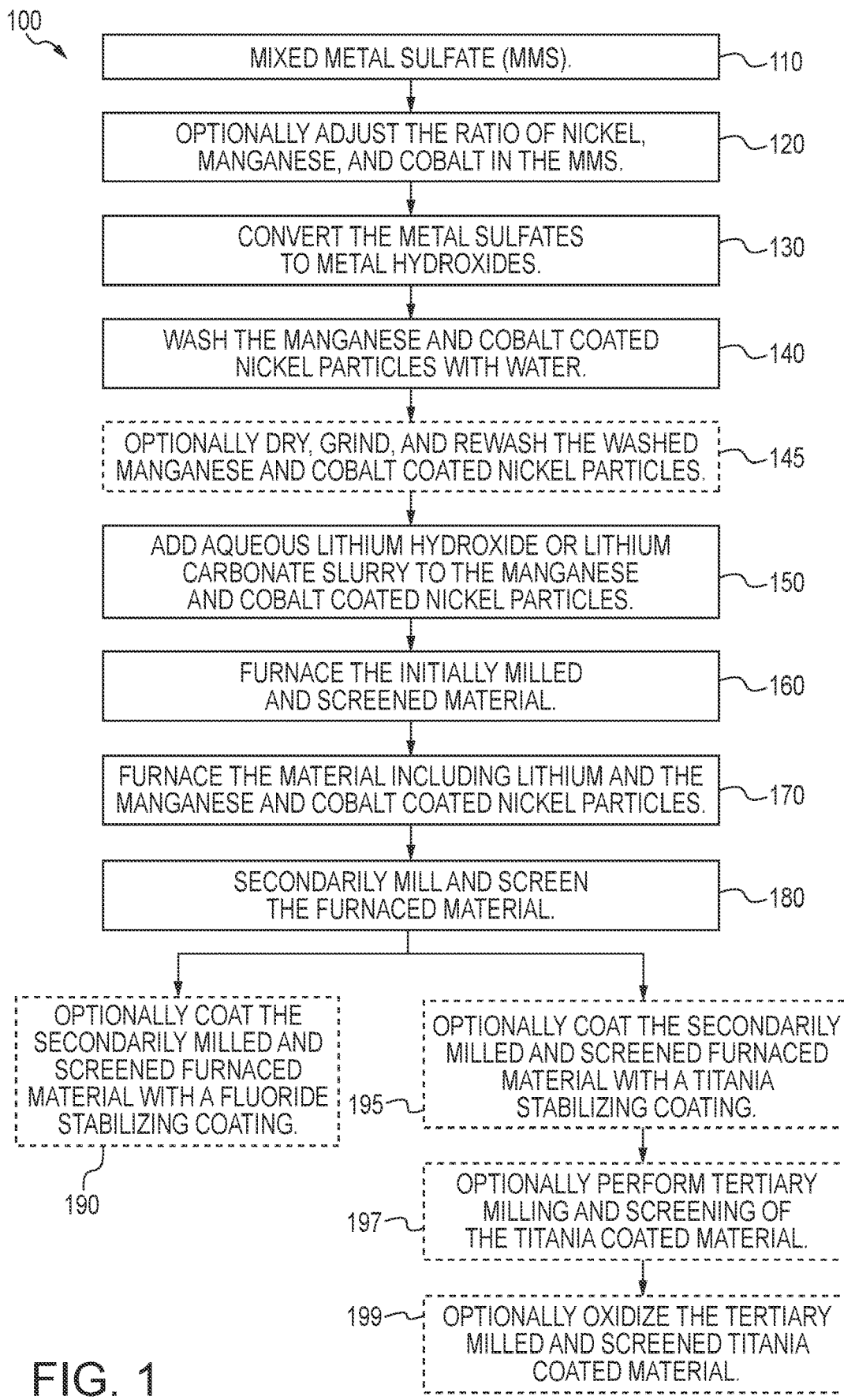
FIG. 1 represents a method for converting a mixed metal sulfate (MMS) starting material obtained from recycled LIB and/or NIMH batteries to a high nickel to manganese and cobalt ratio Cathode Active Material (CAM) for use in the production of new battery electrodes and batteries.

A more efficient and lower cost method for producing electrochemically stable, and thus safe from thermal runaway, high electrochemical capacity coated lithium nickelate is disclosed. The coated nickelate hydroxide particles are formed from a mixed metal sulfate solution (MMS) serving as the starting material that is obtained from recycled lithium ion and/or nickel metal hydride batteries. The coating of the particles includes a relatively small amount of cobalt/manganese oxide forming the surface of the nickelate particles, while the core of the particles includes a relatively large amount of nickel in relation to the weight of the coating. Battery cathode electrodes may be manufactured by using the obtained coated lithium nickelate particles as the cathode active material (CAM) in forming the battery cathodes.

By coating the otherwise prone to thermal runaway lithium nickelate particles with a lithium cobalt/manganese oxide layer, a minimum amount of cobalt/manganese oxide is used to prevent thermal runaway while maintaining the high energy density of close to substantially pure lithium nickelate. The resulting lithium cobalt/manganese oxide coated lithium nickelate particles have a high nickel to manganese and cobalt ratio and may be used directly to form the cathodes of lithium-ion cells. High nickel to manganese to cobalt ratios start at 6:2:2 and extend to 9.2:0.4:0.4, at which point thermal runaway safety is lost. Thus, a high nickel to manganese and cobalt ratio material is at least 60% by weight nickel in relation to the combined nickel/manganese/cobalt metal content.

For example, if a non-coated but substantially homogenously diluted lithium nickelate particle was formed with cobalt/manganese oxide as the diluent, the particles would at least require a 2:1 weight ratio of cobalt/manganese oxide to lithium nickelate to prevent thermal runaway. In contrast, in the coated particles produced from the described method, the weight ratio of coating to lithium nickelate is from 4:6 to 2:8. Preferably, the cobalt/manganese oxide coated lithium nickelate particles produced by the method from the MMS have a molecular composition of $Li_nNi_xMn_yCo_zO_2$ where n=0.95 to 1.1; x=0.70-0.96; y=0.03-0.20; z=0.03-0.20, and where y+z=0.04-0.30.

The MMS starting material for use in the method may be obtained from multiple sources. One preferred source is the purified mixed metal sulfate solution obtained from recycled lithium ion NMC batteries as described in U.S. Pat. No. 11,316,208, filed Mar. 31, 2021, entitled "Process for Recycling Cobalt and Nickel from Lithium-Ion Batteries". A second preferred source are the recycled materials obtained from NiMH batteries as described in U.S. patent application Ser. No. 17/890,314, filed Aug. 18, 2022, entitled "Recycling Process for Isolating and Recovering Rare Earth Metals and Nickel Hydroxide from Nickel Metal Hydride Batteries". Both battery recycling methods produce a sulfate solution including varying concentrations of nickel, manganese, and cobalt sulfates.

Adequately purified mixed metal sulfates including nickel, manganese, and cobalt sulfates from other sources also may be used as the MMS starting material for the method. While starting materials lacking one or more of these metal compounds could be used, a benefit of the described method is that mixtures of these metals as sulfates may be used without the need for prior separation of the metals. Lower cost nickel sulfate containing small amounts of cobalt, such as electroplating grade, can be used as a source of the added nickel. Additionally, the purified nickel sulfate or nitrate solutions produced from nickel mining, which contain small amounts of cobalt (1%-4% by weight) can be used directly without first separating the cobalt as conventionally done. Thus, the disclosed method does not need to separate or otherwise isolate cobalt and/or manganese from the nickel present in the sulfate solution from the recycled battery material to provide the desired particles. However, recycled lithium-ion battery materials originating from lithium iron phosphate technology batteries do not provide a preferred starting material for the method due to the phosphate and iron component.

FIG. 1 represents a method 100 for converting a mixed metal sulfate (MMS) starting material obtained from recycled Lithium-Ion Batteries (LIB) and/or recycled Nickel Metal Hydride (NIMH) batteries to a high nickel to manganese and cobalt ratio Cathode Active Material (CAM) for use in the production of new battery electrodes and batteries.

In MMS 110, a mixed metal sulfate includes sulfates of nickel, manganese, and cobalt in varying ratios as recovered from the recycling of LIB and/or NIMH batteries is the preferred starting material. Typical ratios of nickel to manganese to cobalt in the MMS as recovered from recycled batteries range from 1:2:3 to 9:1:1. Preferably, the MMS 110 is homogeneous, aqueous sulfate solution including nickel, manganese, and cobalt, more preferably with higher relative nickel concentrations.

In optional ratio adjustment 120 the ratio of nickel, manganese, and cobalt in the MMS are adjusted with one or more salts of nickel, manganese, and cobalt to provide a ratio from 3:1:1 to 8:1:1 or preferably from 3:1:1 to 9.2:0.4:0.4. This step is optional as the MMS starting material may include these preferred ratios as obtained from the recycled batteries. Preferable salts of nickel include nickel sulfate, nickel hydroxide, and nickel oxide; preferable salts of manganese include manganese sulfate, manganese hydroxide, and manganese oxide; and preferable salts of cobalt include cobalt sulfate, cobalt hydroxide, and cobalt oxide, but other salts of these metals may be used that are compatible with the reaction conditions and separation steps of the method 100. Depending on the source of the MMS 110 generally additional nickel and some manganese are added to achieve the desired ratios as the MMS 110 solution has a relatively high cobalt concentration. Thus, once the cobalt concentration of the MMS 110 is known, manganese may be added to achieve a 1:1 ratio of cobalt to manganese and then the nickel added to achieve the desired ratio between the three metals. The added nickel salts are not required to be "pure" as nickel salts having from 0.3% to 4% by weight cobalt preferably may be used to achieve the desired metal ratios.

Relatively small amounts of other metals and/or metal salts that improve safety or provide enhanced charge/discharge rates in relation to pure lithium nickelate, such as lanthanide salts, preferably lanthanide nitrate salts, aluminum salts, preferably aluminum nitrate salts, and sulfate salts, optionally may be added if compatible with the reaction conditions and separation steps of the method 100 during the optional ratio adjustment 120.

In the optional ratio adjustment 120, up to 100% of the manganese may be replaced with aluminum, preferably in the form of aluminum oxide, aluminum sulfate, aluminum nitrate, or combinations thereof. If aluminum is added during the optional ratio adjustment 120, a NCA type CAM is produced from the method 100.

In hydroxide conversion 130, the metal sulfates are converted to metal hydroxides. The metal sulfates from the MMS 110 or the optional ratio adjustment 120 are treated with a metal hydroxide at a pH from 5-7 in an agitated reactor at a temperature from 30 degrees Celsius to 90 degrees Celsius, preferably from 55 degrees Celsius to 70 degrees Celsius. Preferably the initial pH of the mixture is 6 and the metal hydroxide is sodium hydroxide, however, other compatible metal hydroxides may be used. The pH is then increased until a pH from 10 to 11 is reached with additional metal hydroxide. During the hydroxide conversion 130 nickel hydroxide is the first to precipitate with manganese and cobalt hydroxides precipitating on top of the previously precipitated nickel hydroxide as the pH is raised. This two stage precipitation results in the initially precipitated nickel hydroxide being coated by the secondarily precipitated manganese and cobalt hydroxides—thus producing the desired manganese and cobalt coated nickel particles to form a NMC type CAM. The resulting slurry is filtered in a filter press, Rosamund filter, or other commercially available filters, more preferably with pressure to reduce the contained water content to produce a filtrate. Preferably, pressures up to 480 to 700 kPa are used.

In wash 140, the manganese and cobalt coated nickel particles are washed in the filter with water to remove remaining sulfate and sodium, and preferably the pressure re-applied to the filtrate. The first wash is preferably combined with the filtrate resulting from the hydroxide conversion 130 and pressure re-applied. Subsequent washes are preferably discharged since they contain relatively low levels of sulfate and lithium.

In optional dry, grind, and rewash 145, the washed manganese and cobalt coated nickel particles may be dried from 100 to 110 degrees Celsius, ground to a particle size preferably from −200 to −325-mesh, and then again filtered and washed with water to further remove any remaining sodium sulfate. This filtration may be assisted with vacuum or pressure, preferably with pressure as previously discussed. The manganese and cobalt coated nickel hydroxide particles may be further processed as described below or stored for future use.

In aqueous lithium addition 150, an aqueous lithium salt slurry, preferably a lithium hydroxide or lithium carbonate slurry, is added to the washed manganese and cobalt coated nickel hydroxide particles originating from the wash 140 or from the optional dry, grind, and rewash 145. The aqueous lithium salt slurry is preferably saturated with the lithium salt at 95 degrees Celsius and includes 20% to 30% by weight lithium salt in relation to the total weight of the aqueous slurry.

Preferably, a 3% to 8% molecular excess of lithium in relation to the manganese/cobalt/nickel is used, as represented below in Scheme I. The aqueous lithium is preferably added in a closed reactor that substantially excludes atmospheric contamination and the aqueous mixture is heated from 80 degrees Celsius to 150 degrees Celsius, preferably from 80 degrees Celsius to 120 degrees Celsius, over the time of 0.5 to 4 hours. The reactor is then opened to drive off unwanted water with continued agitation. This reaction may be represented as shown below in Scheme I.

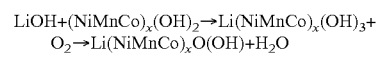

$$\text{LiOH} + (\text{NiMnCo})_x(\text{OH})_2 \rightarrow \text{Li}(\text{NiMnCo})_x(\text{OH})_3 + O_2 \rightarrow \text{Li}(\text{NiMnCo})_x\text{O}(\text{OH}) + \text{H}_2\text{O}$$

Scheme I

This temperature range in combination with the aqueous reaction conditions and saturated lithium hydroxide slurry are believed to cause the lithium to penetrate the solid, non-crystalline manganese and cobalt coated nickel hydroxide particles more effectively than if the lithium were forced to migrate at high temperature in a dry state, thus shortening the lithiation time and lowering subsequent furnacing temperatures.

While preferable to use a closed reactor during the lithiation, the aqueous lithium addition 150 may be performed in a reactor that is open to the atmosphere, however, this is not preferred as with the open reactor the water can evaporate too rapidly, thus not allowing sufficient time for the liquid phase contact lithiation reaction. In this event, the "x" in Scheme I can approximate 1. The carbon dioxide in the air can also convert the hydroxide to a carbonate, which is not reactive under these conditions, thus resulting in lower cathode activity of the resulting material.

The water is preferably removed through evaporation to the atmosphere or assisted with vacuum until dry material is produced including lithium and the manganese and cobalt coated nickel particles. This reaction may be represented as shown below in Scheme II.

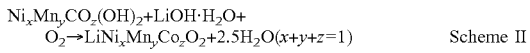

Ni$_x$Mn$_y$Co$_z$(OH)$_2$+LiOH·H$_2$O+ O$_2$→LiNi$_x$Mn$_y$Co$_z$O$_2$+2.5H$_2$O($x$+$y$+$z$=1)    Scheme II In initial milling and screening 160, the dried material from the aqueous lithium addition 150 is milled, ground, or otherwise mechanically reduced in particle size until the material passes through a screen having a mesh preferably from −100 to −500, more preferably a screen having a −200 mesh. Any oversize dried material is preferably again mechanically reduced in particle size until all the material passes through the screen.

In furnacing 170, the material including lithium and the manganese and cobalt coated nickel particles produced from the initial milling and screening 160 is preferably then ground from −250 to −325 mesh, more preferably to −325 mesh, and then furnaced above 700 degrees Celsius, preferably above 730 degrees Celsius, and more preferably from 740 to 850 degrees Celsius for 0.5 to 4 hours, preferably from 1 to 3 hours, and more preferably from 1 to 2 hours, in the presence of oxygen. Preferably, the oxygen is provided by the atmosphere, an oxygen enriched atmosphere, or an atmosphere primarily of oxygen to produce an atmospherically stable, LiNi$_x$Mn$_y$Co$_z$O$_2$ material.

These furnacing timeframes provide a significant improvement and energy savings over conventional techniques requiring 10 to 24 hour furnacing durations, sintering, and the like as used in conventional CAM furnacing processes where the lithium hydroxide or lithium carbonate in dry form is mixed with solid NMC hydroxide and heated at high temperature for the 10 to 24 hour timeframe.

In secondary milling and screening 180, the LiNi$_x$Mn$_y$Co$_z$O$_2$ material produced from the furnacing 170 is milled, ground our otherwise mechanically reduced in particle size until the material is from −30 to −70 microns, more preferably −50 microns. The resulting material is preferably stored under a dry atmosphere, as being an oxide, the material is no longer oxygen sensitive but retains sensitivity to moisture. The resulting material has the molecular composition LiNi$_x$Mn$_y$Co$_z$O$_2$ as previously discussed and retains the cobalt/manganese oxide coating on the formed lithium nickelate particles. Thus, the method 100 incorporates lithium into the previously manganese and cobalt coated nickelate particles to form Mn/Co coated lithium nickelate particles.

In optional fluoride stabilizing coating formation 190, a fluoride stabilizing coating may be formed on the existing manganese/cobalt oxide coating through the treatment of the material obtained from the secondary milling and screening 180 with a fluoride solution, including dilute hydrofluoric acid (HF), ammonium bifluoride, fluoride, and the like. The solvent used to form the fluoride solution is preferably alcoholic, with a mixture of methanol and isopropanol being more preferred. The concentration of fluoride in the alcoholic solvent is preferably 2% to 3% by weight. The alcoholic solvent is preferably removed by distillation.

The fluoride solution forms an inert layer of fluoride on the previously formed Mn/Co coated lithium nickelate particles. This coating reduces the surface base concentration and the surface oxidation potential for the reaction of the electrolyte with organic solvents of the electrolyte when the particles are used to form a cathode for the battery that otherwise would occur. The fluoride addition may be restricted to a 0.05% to 1.0% weight percent addition to the coated lithium nickelate particles.

In optional titania stabilizing coating formation 195, a titania stabilizing coating may be formed on the existing manganese/cobalt oxide coating through the treatment of the material obtained from the secondary milling and screening 180 with a titanium solution. Useful forms of titanium to form the solution include titanium alkoxides and alcohol-soluble organic complexes of titanium, such as titanium tetraisopropoxide. The solvent used to form the titanium solution is preferably alcoholic having relatively low boiling points and oxidation resistance, with secondary alcohols such as isopropanol being preferred. The concentration of titanium in the solvent is preferably 2% to 3% by weight. After this mixture is stirred at from 40 degrees to 60 degrees Centigrade, preferably at 50 degrees Centigrade for a period from one-half to three hours, preferably for one hour, the alcoholic solvent is then distilled from the reactor while stirring and heating from 90 degrees Celsius to 120 degrees Celsius, preferably at 100 degrees Celsius, to produce a dry powder.

In optional tertiary milling and screening 197, the dry power from the optional titania stabilizing coating formation 195 is then screened through a −200-mesh screen, with any remaining agglomerates being milled and rescreened through the −200-mesh screen until substantially all of the material passes through the screen.

In optional oxidizing 199, the −200-mesh material from the optional milling and screening 197 is heated under oxygen to 370 degrees Celsius to 450 degrees Celsius, preferably at 400 degrees Celsius and held for one to three, preferably 2 hours. The temperature is then raised to 680 degrees Celsius to 800 degrees Celsius for two to five, preferably 3, hours before cooling. The resulting powder is then milled under dry atmosphere to <30 microns and stored under nitrogen as a CAM suitable for lithium-ion battery cathode and battery production.

The use of the coated lithium nickelate particles with or without an optional stabilizing coating obtained from the method allows the use of recycled lithium-ion and/or NIMH batteries to form new lithium-ion batteries, and may provide for the complete recycling of old batteries into new batteries. The method preserves and conserves sufficient cobalt needed for lithium batteries so that very little new cobalt is needed to produce new lithium-ion batteries, since the cobalt content that may be obtained from spent older-technology high cobalt EV and consumer recycled batteries is relatively large in comparison to the much lower cobalt content used to form new-technology high nickel content cathodes with much lower cobalt content as used in new lithium-ion batteries.

The coated lithium nickelate particles may be used to form lithium batteries having a cathode, an anode, and an electrolyte. Similarly, the coated lithium nickelate particles may be used to form lithium batteries having a cathode, an anode, and a separator between the cathode and anode. To form the cathode, the coated lithium nickelate particles may be used as the CAM by coating the coated lithium nickelate particles onto a metal foil, preferably an aluminum foil, with the addition of a binder. Suitable binders may include polyvinylidene fluoride, polytetrafluoroethylene, polyvinyl acetate, and polymethyl methacrylate.

In addition to the binder, a conductive carbon matrix material also may be added to the CAM. Suitable conductive carbon matrix materials may include natural graphite, synthetic graphite, and acetylene black. The CAM material is applied to the aluminum foil as a slurry containing the CAM, carbon, binder, and solvent using sufficient solvent to uniformly disperse the CAM, binder, and/or conductive carbon matrix material, and any other desired solids to form a coating mixture, and then applying the coating mixture onto a aluminum foil, followed by drying. Suitable solvents may include N-methyl pyrrolidone, tetrahydrofuran, and dimethylformamide, with N-methyl pyrrolidone being preferred at present.

Figure 2:
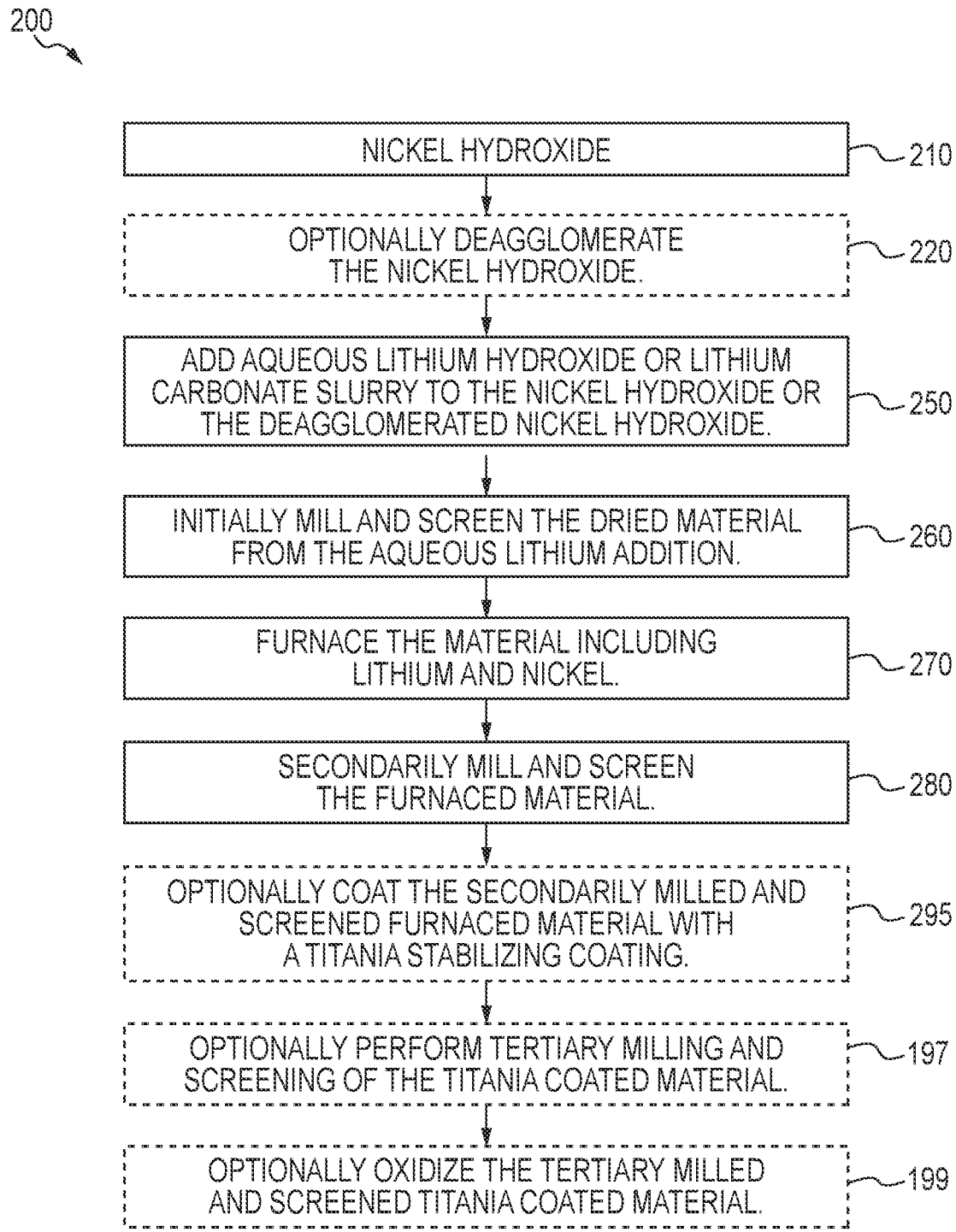
FIG. 2 represents a method for lithiating commercially available nickel hydroxide into a nano-crystalline lithium nickelate for use as a CAM in the production of new battery electrodes and batteries.

FIG. 2 represents method 200 for lithiating commercially available nickel hydroxide into a nano-crystalline lithium nickelate for use as a CAM in the production of new battery electrodes and batteries. Preferably, the method 200 provides a nano-crystalline high purity stable lithium nickelate powder with maximum energy capacity (>330 mAh/g) without the need for coatings as previously described in the context of FIG. 1 to provide an electrochemically stable, and thus safe from thermal runaway CAM. The lithium nickelate produced from the method 200 preferably has the maximum energy capacity of any lithium spinel type metal oxide.

In nickel hydroxide 210, an at least 96% pure by weight, preferably at least 98% pure by weight, nickel hydroxide solid, such as available from UMICORE, Germany, is the starting material. The nickel hydroxide 120 preferably includes <1% by weight other contaminating metals.

In optional deagglomeration 220, the nickel hydroxide is mechanically reduced in aggregate size to pass through a −150 to −250 mesh screen, preferably a −200 mesh screen. The deagglomeration 220 may be performed with a high-energy mixer in addition to milling, grinding, or the like. This step is optional because the material as commercially obtained will often pass through the preferred −200-mesh screen with little mechanical force applied.

In aqueous lithium addition 250, an aqueous lithium salt slurry, preferably where the lithium salt is lithium hydroxide or lithium carbonate, is added to the nickel hydroxide particles as commercially obtained or from the optional deagglomeration 220. The aqueous lithium hydroxide slurry is preferably saturated at 95 degrees Celsius or higher and includes 20% to 30% by weight lithium hydroxide in relation to the total weight of the aqueous phase of the slurry.

Preferably, a 3% to 8% molecular excess of lithium in relation to the nickel hydroxide particles is used. The aqueous lithium is preferably added in a closed reactor that substantially excludes atmospheric contamination and the aqueous mixture is heated from 80 degrees Celsius to 150 degrees Celsius, preferably from 80 degrees Celsius to 120 degrees Celsius, over the time of 0.5 to 4 hours. The reactor is then opened to drive off unwanted water with continued agitation. This reaction may be represented as shown below in Scheme III.

LiOH+Ni(OH)$_2$→Li(Ni)(OH)$_3$+O$_2$→LiNiO(OH)+ H$_2$O    Scheme III

This temperature range in combination with the aqueous reaction conditions and saturated lithium hydroxide slurry are believed to cause the lithium to penetrate the solid, non-crystalline nickel hydroxide particles more effectively than if the lithium were forced to migrate at high temperature in a dry state, thus shortening the lithiation time and lowering subsequent furnacing temperatures.

While preferable to use a closed reactor during the lithiation, the aqueous lithium addition 250 may be performed in a reactor that is open to the atmosphere, however, this is not preferred as with the open reactor the water can evaporate too rapidly, thus not allowing sufficient time for the liquid phase contact lithiation reaction.

The water is preferably removed through evaporation to the atmosphere or assisted with vacuum until dry material is produced including lithium and nickel particles. This reaction may be represented as shown below in Scheme IV.

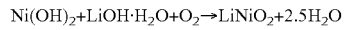

Ni(OH)$_2$+LiOH·H$_2$O+O$_2$→LiNiO$_2$+2.5H$_2$O    Scheme IV

In initial milling and screening 260, the dried material from the aqueous lithium addition 250 is milled, ground, or otherwise mechanically reduced in particle size until the material passes through a screen having a mesh preferably from −30 to −160 microns, more preferably a screen having a −200 mesh. Any oversize dried material is preferably again mechanically reduced in particle size until all the material passes through the screen.

In furnacing 270, the dried material including lithium and the nickel particles produced from the initial milling and screening 260 is then ground from −250 to −325 mesh, preferably to −325 mesh, and then furnaced above 700 degrees Celsius, preferably above 730 degrees Celsius, and more preferably from 740 to 850 degrees Celsius for 0.5 to 4 hours, preferably from 1 to 3 hours, and more preferably from 1 to 2 hours, in the atmosphere, in an oxygen enriched atmosphere, or in an atmosphere primarily of oxygen to produce an atmospherically stable, LiNiO$_2$ material.

These furnacing timeframes provide a significant improvement and energy savings over conventional techniques requiring 10 to 24 hour furnacing durations, sintering, and the like as used in conventional CAM furnacing processes where the lithium hydroxide in dry form is mixed with solid nickel hydroxide and heated at high temperature for the 10-to-24-hour timeframe.

In secondary milling and screening 280, the material produced from the furnacing 270 is milled, ground or otherwise mechanically reduced in particle size until the material is from −30 to −70 microns, more preferably −50 microns. The resulting material is preferably stored under a dry atmosphere, as being an oxide, the material is no longer oxygen sensitive but retains sensitivity to moisture. The resulting material has the molecular composition LiNiO$_2$ as previously discussed. Thus, the method 200 incorporates lithium to form the nano-crystalline lithium nickelate.

In optional titania stabilizing coating formation 295, a titania stabilizing coating may be formed on the existing nano-crystalline lithium nickelate through the treatment of the material obtained from the secondary milling and screening 280 with a titanium solution. Useful forms of titanium to form the solution include titanium alkoxides and alcohol-soluble organic complexes of titanium, such as titanium tetraisopropoxide. The solvent used to form the titanium solution is preferably alcoholic having relatively low boiling points and oxidation resistance, with secondary alcohols such as isopropanol being preferred. The concentration of titanium in the solvent is preferably 2% to 3% by weight. After this mixture is stirred at from 40 degrees to 60 degrees Centigrade, preferably at 50 degrees Centigrade for a period from one-half to three hours, preferably for one hour, the alcoholic solvent is then distilled from the reactor while stirring and heating from 90 degrees Celsius to 120 degrees Celsius, preferably at 100 degrees Celsius, to produce a dry powder.

In optional tertiary milling and screening 297, the dry power from the optional titania stabilizing coating formation 295 is then screened through a −200-mesh screen, with any remaining agglomerates being milled and rescreened through the −200-mesh screen until substantially all of the material passes through the screen.

In optional oxidizing 299, the −200-mesh material from the optional milling and screening 297 is heated under oxygen to 370 degrees Celsius to 450 degrees Celsius, preferably at 400 degrees Celsius and held for one to three, preferably 2 hours. The temperature is then raised to 680 degrees Celsius to 800 degrees Celsius for two to five, preferably 3, hours before cooling. The resulting powder is then milled under dry atmosphere to <30 microns and stored under nitrogen as a CAM suitable for lithium-ion battery cathode and battery production.

The following examples illustrate one or more preferred embodiments of the invention. Numerous variations may be made to the following examples that lie within the scope of the invention.

EXAMPLES

The mixed metal sulfate solutions used as the starting material for Examples 1-4 were obtained from recycled lithium-ion batteries and/or NIMH batteries and were adjusted to the desired Ni:Mn:Co ratio of 6:2:2 or higher ratios of nickel with added nickel sulfate or other salts, oxides and hydroxides along with the desired cobalt or manganese salts of hydroxides or oxides. The mixed metal hydroxides were precipitated from these slurries with sodium hydroxide solution starting at pH 6 while warm and finished at pH 10-11. The aqueous sodium hydroxide solution and the slurry of the desired adjusted ratio of nickel, manganese and cobalt sulfates were added simultaneously and slowly, but as separate streams into a warm stirred reactor at about pH 6-6.5.

When the solution of mixed metal sulfates was completely added, additional aqueous sodium hydroxide was added to bring the pH up to 10-11 to precipitate the cobalt and nickel onto the already formed nickel hydroxide. The resulting coated NMC hydroxide was then washed to remove sodium and sulfate. Alternatively, the freshly precipitated and coated NMC hydroxide can be dried at 100-110° C., ground, and then washed free of sodium sulfate. This was the starting coated NMC for the examples that follow.

Example 1: Preparation of Lithium Nickel/Manganese/Cobaltate (NMC: 8:1:1)

To a 4-liter SS reactor equipped with jacketed heating and equipped with a heavy duty double planetary mixer was added, 1.0 kg nickel/manganese/cobalt hydroxide (NMC ratio: 8:1:1), (NiMnCo(OH)$_2$) (10.9 m), 2 liters water, and 491 g (11.55 m) lithium hydroxide monohydrate, LiOH·H$_2$O. The reactor was sealed, stirred, and heated to 110° C. for 2 hours. Then the reactor was slowly vented to remove water and vacuum was applied to assist in removing the water until a thick paste was obtained and stirring was difficult, while letting the temperature slowly rise to 140-150° C. The stirring was then stopped, and the heat increased to 150-170° C. to remove the non-chemically bound water under vacuum. The stirring was resumed for an hour once the paste had turned to a dry solid which readily ground to a fine powder. The lithium nickelate as the lithium NMC had a final elemental stoichiometry corresponding to LiNiMnCoO(OH) with a nickel to manganese to cobalt ratio of 8:1:1. (Ni:Mn:Co molar ratios of LiNi$_{0.8}$Mn$_{0.1}$Co$_{0.1}$O$_2$).

The powder was cooled and milled and screened through −200 mesh to remove any agglomerates, which in turn were then milled to −200 mesh and recombined with the rest of the −200 mesh material. The powder was then heated in trays with a 0.5-inch depth powder in high nickel alloy SS trays under oxygen to 400° C. and held for 1 hour and then to 735° C. for 2 hours and then cooled. The fine powder was milled under nitrogen to <30 micron and stored under nitrogen for preparing a coated cathode suitable for lithium-ion batteries. The energy capacity of this material in a coin cell with a lithium metal anode was 340 mA/g. The XRD showed a weak structure of lithium nickelate, indicating that only initial nano-crystalline lithium NMC (8:1:1) had formed at this low furnacing temperature which was desired to gain maximum energy capacity. The yield was quantitative for lithium NMC CAM powder.

Example 2: Preparation of Lithium Nickel/Manganese/Cobaltate (NMC: 9:0.5:0.5)

To a 4-liter SS reactor equipped with jacketed heating and equipped with a heavy duty double planetary mixer was added, 1.0 kg nickel/manganese/cobalt hydroxide (NMC ratio: 9:0.5:0.5), (NiMnCo(OH)$_2$) (10.9 m), 2 liters water, and 491 g (11.55 m) lithium hydroxide monohydrate, LiOH·H$_2$O. The reactor was sealed, stirred, and heated to 110° C. for 2 hours with some oxygen pressure to maintain an oxidizing atmosphere. Then the reactor was slowly vented to remove water and vacuum was applied to assist in removing the water until a thick paste was obtained and stirring was difficult, while letting the temperature to slowly rise to 140-150° C. The heat was increased to 150-170° C. to remove the non-chemically bound water in the presence of air while stirring for an hour to turn paste into a dry solid which readily ground down to a fine powder. The lithium nickelate as the lithium NMC had a final elemental stoichiometry corresponding to LiNiMnCoO(OH) with a metal compounds ratio of 9:0.5:0.5.

The powder was cooled and milled and screened through −200 mesh to remove any agglomerates, which in turn were then milled to −200 mesh and recombined with the rest of the −200-mesh material. The powder was then heated in trays with a 0.5-inch depth powder in high nickel alloy SS trays under oxygen to 400° C. and held for 1 hour and then to 735° C. for 2 hours and then cooled. The fine powder was milled under nitrogen to <50 micron and stored under nitrogen for preparing a coated cathode suitable for lithium-ion batteries. The energy capacity of this material in a coin cell with a lithium metal anode was 340 mA/g. The XRD showed a weak structure of lithium nickelate, indicating that only initial nano-crystalline lithium NMC (8:1:1) had formed at this low furnacing temperature which was desired to gain maximum energy capacity. The yield was quantitative for lithium NMC CAM powder.

Example 3: Preparation of Fluorinated Lithium Nickel/Manganese/Cobaltate (NMC: 8:1:1)

To a 4-liter SS reactor equipped with jacketed heating and equipped with a heavy duty double planetary mixer was added, 1.0 kg nickel/manganese/cobalt hydroxide (NMC ratio: 8:1:1), (NiMnCo(OH)$_2$) (10.9 m), 2 liters water, and 491 g (11.55 m) lithium hydroxide monohydrate, LiOH·H$_2$O. The reactor was sealed, stirred, and heated to 110° C. for 2 hours. Then the reactor was slowly vented to remove water and vacuum was applied to assist in removing the water until a thick paste was obtained and stirring was difficult, while letting the temperature to slowly rise to 140-150° C. The stirring was then stopped, and the heat increased to 150-170° C. to remove the non-chemically bound water under vacuum. The stirring was resumed for an hour once the paste had turned to a dry solid which readily ground down to a fine powder. The lithium nickelate as the lithium NMC had a final elemental stoichiometry corresponding to LiNiMnCoO(OH) with a metal compounds 8:1:1 ratio.

The powder was cooled and milled and screened through −200 mesh to remove any agglomerates, which in turn were then milled to −200 mesh and recombined with the rest of the −200 mesh material. The LiNiO(OH) powder was added back into the reactor and re-slurried with 2 liters of isopropanol and 12.1 g (0.18 m) ammonium bifluoride in 250 ml methanol was added and the mixture stirred for 30 minutes. The methanol/isopropanol mixture was then distilled from the reactor with stirring and while heating up to 100° C. until a dry powder was obtained. The reactor was cooled and the aluminum fluoride/lithium fluoride-coated lithium nickelate precursor powder was screened through −200 mesh to remove any agglomerates, which in turn were then milled to −200 mesh and recombined with the rest of the −200 mesh material. The powder was then heated in trays with a 0.5-inch depth powder in high nickel alloy SS trays under oxygen to 400° C. and held for 2 hours and then to 735° C. for 2 hours and then cooled. The fine powder was milled under nitrogen to <50 micron and stored under nitrogen for preparing a coated cathode suitable for lithium-ion batteries. The energy capacity of this material in a coin cell with a lithium metal anode was 320 mA/g. The XRD showed a weak structure of lithium nickelate indicating that only initial nano-crystalline lithium nickelate had formed at this low furnacing temperature which was desired to gain maximum energy capacity. The yield was quantitative for lithium nickelate powder.

Prophetic Example 4: Preparation of Titania-Coated Lithium Nickel/Manganese/Cobaltate To a 4-liter SS reactor equipped with jacketed heating and equipped with a heavy duty double planetary mixer is added, 1.0 kg nickel/manganese/cobalt hydroxide (NMC ratio: 8:1:1), (NiMnCo(OH)$_2$) (10.9 m), 2 liters water, and 491 g (11.55 m) lithium hydroxide monohydrate, LiOH·H$_2$O. The reactor is sealed, stirred, and heated to 110° C. for 2 hours. Then the reactor is slowly vented to remove water and vacuum is applied to assist in removing the water until a thick paste is obtained and stirring becomes difficult, while letting the temperature slowly rise to 140-150° C. The stirring is then stopped, and the heat is increased to 150-170° C. to remove the non-chemically bound water under vacuum. The stirring is resumed for an hour once the paste turns into a dry solid which is readily ground to a fine powder. The lithium nickelate as the lithium NMC has a final elemental stoichiometry corresponding to LiNiMnCoO(OH) with a nickel to manganese to cobalt ratio of 8:1:1. (Ni:Mn:Co molar ratios for LiNi$_{0.8}$Mn$_{0.1}$Co$_{0.1}$O$_2$).

The resulting powder is then cooled, milled, and screened through −200 mesh to remove any agglomerates, which are then milled to −200 mesh and recombined with the −200 mesh material. The LiNiMnCoO(OH) powder is added back into the reactor and reslurried with 2-liters of isopropanol and 36.8 g. (0.123 m) of titanium tetraisopropoxide is added and the mixture warmed to 50° C. and stirred for one hour. The isopropanol is then distilled from the reactor while stirring and heating to 100° C. to produce a dry powder. The reactor is cooled, and the titania/lithium titanate coated lithium nickelate precursor powder screened through −200 mesh to remove any agglomerates which in turn are then milled to −200 mesh and recombined with the −200 mesh material.

The powder is then heated in trays with a 0.5-inch powder depth in high nickel alloy SS trays under oxygen to 400° C. and held for 1-hour and then to 735° C. for 2 hours and then cooled. The fine powder is milled under nitrogen to <30 micron and stored under nitrogen for preparing a coated cathode suitable for lithium-ion batteries. The energy capacity of this material in a coin cell with a lithium metal anode is expected to be 340 mA/g. The XRD is expected to show a weak structure of lithium nickelate, indicating that significant initial nano-crystalline lithium NMC (8:1:1) forms at this low furnacing temperature, as is desirable to obtain maximum energy capacity. The yield is expected to be quantitative for lithium NMC CAM powder.

Example 5: Preparation of Nano-Crystalline Lithium Nickelate

To a 4-liter SS reactor equipped with jacketed heating and equipped with a heavy duty double planetary mixer was added, 1.0 kg (10.79 m) nickel hydroxide, Ni(OH)$_2$, 2 liters of water, and 471 g (11.22 m) lithium hydroxide monohydrate, LiOH·H$_2$O. The reactor was sealed, stirred, and heated to 110° C. for 2 hours with a slight added oxygen pressure. Then the reactor was slowly vented to remove water and vacuum was applied to assist in removing the water until a thick paste was obtained and stirring was difficult, while letting the temperature to slowly rise to 140-150° C. The stirring was then stopped, and the heat increased to 180° C. to remove the non-chemically bound water under vacuum. The stirring was resumed for an hour once the paste had turned to a dry solid which readily ground down to a fine powder. The LiNiO(OH) powder was cooled and milled under nitrogen down to <50 microns. The powder was then heated in trays with a 0.5-inch depth powder in high nickel alloy SS trays under oxygen to 400° C. and held for 1 hour and then to 740° C. for 2 hours and then cooled. The fine powder was milled under nitrogen to <50 micron and stored under nitrogen for preparing a coated cathode suitable for lithium-ion batteries. The energy capacity of this material in a coin cell with a lithium metal anode was 340 mA/g. The XRD showed a weak structure of lithium nickelate indicating that only initial nano-crystalline lithium nickelate had formed at this low furnacing temperature which was desired to gain maximum energy capacity. The yield was quantitative for lithium nickelate powder.

Example 6: Preparation of Titania-Coated Nano-Crystalline Lithium Nickelate

To a 4-liter SS reactor equipped with jacketed heating and equipped with a heavy duty double planetary mixer was added, 1.0 kg (10.79 m) nickel hydroxide, Ni(OH)$_2$, 2 liters of water, and 471 g (11.22 m) lithium hydroxide monohydrate, LiOH·H$_2$O. The reactor was sealed, stirred, and heated to 110° C. for 2 hours. Then the reactor was slowly vented to remove water and a vacuum was applied to assist in removing the water until a thick paste was obtained and stirring was difficult while letting the temperature to slowly rise to 140-150° C. The stirring was then stopped, and the heat increased to 180° C. to remove the non-chemically bound water under vacuum. The stirring was resumed for an hour once the paste had turned to a dry solid which readily ground down to a fine powder.

The LiNiO(OH) powder was cooled and milled under nitrogen down to <30 microns. The LiNiO(OH) powder was added back into the reactor and reslurried with 2 liters of isopropanol and 36.8 g. (0.123 m) of titanium tetraisopropoxide added and the mixture warmed to 50° C. and stirred for one hour. The isopropanol was then distilled from the reactor while stirring and heating to 100° C. to produce a dry powder. The reactor was cooled, and the titania/lithium titanate coated lithium nickelate precursor powder was screened through −200 mesh to remove any agglomerates which in turn were then milled to −200 mesh and recombined with the rest of the −200 mesh material.

The powder was then heated in trays with a 0.5-inch depth powder in high nickel alloy SS trays under oxygen to 400° C. and held for 2 hours and then to 735° C. for 3 hours and then cooled. The fine powder was milled under nitrogen to <30 micron and stored under nitrogen for preparing a coated cathode suitable for lithium-ion batteries. The energy capacity of this material in a coin cell with a lithium metal anode was 320 mA/g. The XRD shows a weak structure of lithium nickelate indicating that substantial initial nano-crystalline lithium nickelate had formed at this low furnacing temperature, which was desired to gain maximum energy capacity. The yield was quantitative for lithium nickelate powder.

To provide a clear and more consistent understanding of the specification and claims of this application, the following definitions are provided.

Nano-Crystalline means that the crystallite are below one micron and may be much smaller.

Unless otherwise indicated, all numbers expressing quantities of ingredients, properties such as amounts, and the like used in the specification and claims are to be understood as indicating both the exact values as shown and as being modified by the term "about". Thus, unless indicated to the contrary, the numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed in light of the margin of error, the number of reported significant digits, and by applying ordinary rounding techniques.

Unless the context clearly dictates otherwise, where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the upper and lower limits, ranges excluding either or both of those included limits are also included in the invention.

The terms "a", "an", and "the" used in the specification claims are to be construed to cover both the singular and the plural, unless otherwise indicated or contradicted by context. No language in the specification should be construed as indicating any non-claimed element to be essential to the practice of the invention.

While the present general inventive concept has been illustrated by description of several example embodiments, and while the illustrative embodiments have been described in detail, it is not the intention of the applicant to restrict or in any way limit the scope of the general inventive concept to such descriptions. Instead, the descriptions and claims herein are to be regarded as illustrative in nature, and not as restrictive, and additional embodiments will readily appear to those skilled in the art upon reading the above description. Additional modifications will readily appear to those skilled in the art. Accordingly, departures may be made from such details without departing from the spirit or scope of applicant's general inventive concept.

While various aspects of the invention are described, it will be apparent to those of ordinary skill in the art that other embodiments and implementations are possible within the scope of the invention. Accordingly, the invention is not to be restricted except in light of the attached claims and their equivalents.

The invention claimed is:

1. A method for preparing lithium nickel manganese cobaltate material for use in lithium batteries as a cathode active material, the method comprising:
converting metal sulfates in a mixed metal sulfate solution to metal hydroxides with a hydroxide until a solution pH from 10 to 11 is reached to produce a slurry;
filtering the slurry to produce a filtrate;
washing the filtrate;
lithiating the filtrate with an aqueous lithium salt slurry to produce a mixture;
removing water from the mixture to produce a dried material;
initially milling and screening the dried material until the dried material passes through a −100 to −500 screen;
furnacing the dried material above 700 degrees Celsius for 0.5 to 4 hours in the presence of oxygen to produce a $LiNi_xMn_yCo_zO_2$ material; and
secondarily milling and screening the $LiNi_xMn_yCo_zO_2$ material until the $LiNi_xMn_yCo_zO_2$ material is from −30 to −70 microns to produce the lithium nickel manganese cobaltate material.

2. The method of claim 1, where the lithium nickel manganese cobaltate material has a nickel to manganese to cobalt ratio from 6:2:2 to 9.2:0.4:0.4.

3. The method of claim 1, where the lithium nickel manganese cobaltate material is at least 60% by weight nickel in relation to the combined nickel/manganese/cobalt metal content.

4. The method of claim 1, where the lithium nickel manganese cobaltate material has a weight ratio of manganese and cobalt to lithium nickelate from 4:6 to 2:8.

5. The method of claim 1, where the lithium nickel manganese cobaltate material has an empirical formula:

$$Li_nNi_xMn_yCo_zO_2,$$

where n is from 0.95 to 1.1
where x is from 0.70 to 0.98,
where y is from 0.03 to 0.2,
where z is from 0.03 to 0.2, and
where y+z=0.04 to 0.40.

6. The method of claim 1, where the mixed metal sulfate solution comprises cobalt, manganese, and nickel.

7. The method of claim 6, where the cobalt comprises from 1% to 4% by weight of the mixed metal sulfate solution.

8. The method of claim 6, where a ratio of the nickel to the manganese to the cobalt is from 1:2:3 to 9:1:1.

9. The method of claim 6, further comprising replacing up to 100% of the manganese with aluminum, where the aluminum is chosen from aluminum oxide, aluminum sulfate, aluminum nitrate, and combinations thereof.

10. The method of claim 6, where the mixed metal sulfate solution originates from recycled battery material.

11. The method of claim 10, where the recycled battery material originates from lithium-ion batteries.

12. The method of claim 10, where the recycled battery material originates from nickel metal hydride batteries.

13. The method of claim 1, further comprising prior to the converting the metal sulfates in the mixed metal sulfate solution to the metal hydroxides, adjusting a ratio of nickel to manganese to cobalt in the mixed metal sulfate solution to a ratio from 3:1:1 to 8:1:1.

14. The method of claim 1, further comprising adding at least one of lanthanide salts, lanthanide nitrate salts, aluminum salts, and aluminum nitrate salts to enhance the charge/discharge rate of a battery comprising the lithium nickel manganese cobaltate material.

15. The method of claim 1, where the hydroxide is sodium hydroxide and the converting the metal sulfates in the mixed metal sulfate solution to the metal hydroxides is performed from 30 degrees Celsius to 90 degrees Celsius.

16. The method of claim 1, where during the converting the metal sulfates in the mixed metal sulfate solution to the metal hydroxides, nickel hydroxide precipitates first with manganese and cobalt hydroxides precipitating on top of the previously precipitated nickel hydroxide as the pH is raised to produce manganese and cobalt coated nickel particles.

17. The method of claim 1, further comprising after the washing the filtrate, drying, grinding, and rewashing the filtrate.

18. The method of claim 17, where the grinding is to a particle size from −200 to −325 mesh.

19. The method of claim 1, where the aqueous lithium salt slurry comprises lithium hydroxide, lithium carbonate, or combinations thereof.

20. The method of claim 19,
where the aqueous lithium salt slurry is saturated with the lithium salt at 95 degrees Celsius, and
where the lithium salt slurry includes 20% to 30% by weight of the lithium salt in relation to the total weight of the aqueous lithium salt slurry.

21. The method of claim 1, where the lithiating the filtrate with the aqueous lithium salt slurry is performed from 80 degrees Celsius to 150 degrees Celsius for a time from 0.5 to 4 hours.

22. The method of claim 1, where the removing the water from the mixture to produce the dried material is performed by evaporation to the atmosphere, assisted with vacuum, or a combination thereof.

23. The method of claim 1, comprising initially milling and screening the dried material until the dried material passes through a −200 screen.

24. The method of claim 1, further comprising grinding from −250 to −325 mesh the dried material that passes through the −100 to −500 screen.

25. The method of claim 1, comprising furnacing the dried material above 730 degrees Celsius from 1 to 2 hours in the presence of oxygen to produce the $LiNi_xMn_yCo_zO_2$ material.

26. The method of claim 1, where the oxygen is from at least one of the atmosphere, an oxygen enriched atmosphere, and an atmosphere primarily of oxygen.

27. The method of claim 1, comprising secondarily milling and screening the $LiNi_xMn_yCo_zO_2$ material until the $LiNi_xMn_yCo_zO_2$ material is −50 microns to produce the lithium nickel manganese cobaltate material.

28. The method of claim 1, further comprising forming a fluoride stabilizing coating on the lithium nickel manganese cobaltate material.

29. The method of claim 28, comprising forming the fluoride stabilizing coating by combining the lithium nickel manganese cobaltate material with a fluoride solution.

30. The method of claim 29, where the fluoride solution comprises at least one of dilute hydrofluoric acid, ammonium bifluoride, and fluoride.

31. The method of claim 29, where the fluoride solution comprises an alcoholic solvent, where the alcoholic solvent is a mixture of methanol and isopropanol.

32. The method of claim 29, where the fluoride solution has a fluoride concentration in the solvent from 2% to 3% by weight.

33. The method of claim 1, further comprising forming a titania stabilizing coating on the lithium nickel manganese cobaltate material.

34. The method of claim 33, comprising forming the titania stabilizing coating by combining the lithium nickel manganese cobaltate material with a titania solution.

35. The method of claim 34, where the titania solution comprises at least one of titanium alkoxides, alcohol-soluble organic complexes of titanium, and titanium tetraisopropoxide.

36. The method of claim 34, where the titania solution comprises an alcoholic solvent, where the alcoholic solvent is chosen from secondary alcohols and isopropanol.

37. The method of claim 34, where the titania solution has a titanium concentration in the solvent from 2% to 3% by weight.

38. The method of claim 33, further comprising milling and screening the titania coated lithium nickel manganese cobaltate material until substantially all of the titania coated lithium nickel manganese cobaltate material passes through a −200-mesh screen.

39. The method of claim 38, further comprising oxidizing the −200-mesh screened titania coated lithium nickel manganese cobaltate material by heating the −200-mesh screened titania coated lithium nickel manganese cobaltate material under oxygen from 370 degrees Celsius to 450 degrees Celsius for one to three hours; and milling the oxidized material to <30 microns.

40. The method of claim 1, further comprising forming a cathode comprising the lithium nickel manganese cobaltate material, a binder, and a metal foil.

41. A cathode electrode comprising the lithium nickel manganese cobaltate material of claim 1.

42. A lithium-ion battery comprising the lithium nickel manganese cobaltate material of claim 1.

43. A method for lithiating commercially available nickel hydroxide into a nano-crystalline lithium nickelate for use in lithium batteries as a cathode active material, the method comprising:
lithiating nickel hydroxide particles with an aqueous lithium salt slurry to produce a mixture;
removing water from the mixture to produce a dried material;
initially milling and screening the dried material until the dried material passes through a −30 to −160 micron screen;
furnacing the dried material above 700 degrees Celsius for 0.5 to 4 hours in the presence of oxygen to produce a $LiNiO_2$ material; and
secondarily milling and screening the $LiNiO_2$ material until the $LiNiO_2$ material is from −30 to −70 microns to produce the nano-crystalline lithium nickelate.

44. The method of claim 43, further comprising prior to the lithiating the nickel hydroxide particles, mechanically deagglomerating the nickel hydroxide to pass through a −150 to −250 mesh screen.

45. The method of claim 43, where the aqueous lithium salt slurry comprises lithium hydroxide, lithium carbonate, or combinations thereof.

46. The method of claim 45,
where the aqueous lithium salt slurry is saturated with the lithium salt at 95 degrees Celsius, and
where the lithium salt slurry includes 2% to 30% by weight of the lithium salt in relation to the total weight of the aqueous lithium salt slurry.

47. The method of claim 43, where the lithiating the nickel hydroxide particles with the aqueous lithium salt slurry is performed from 80 degrees Celsius to 150 degrees Celsius for a time from 0.5 to 4 hours.

48. The method of claim 43, where the removing the water from the mixture to produce the dried material is performed by evaporation to the atmosphere, assisted with vacuum, or a combination thereof.

49. The method of claim 43, comprising initially milling and screening the dried material until the dried material passes through a −200 screen.

50. The method of claim 43, further comprising grinding from −250 to −325 mesh the dried material that passes through the −30 to −160 micron screen.

51. The method of claim 43, comprising furnacing the dried material above 730 degrees Celsius from 1 to 2 hours in the presence of oxygen to produce the $LiNiO_2$ material.

52. The method of claim 43, where the oxygen is from at least one of the atmosphere, an oxygen enriched atmosphere, and an atmosphere primarily of oxygen.

53. The method of claim 43, comprising secondarily milling and screening the $LiNiO_2$ material until the $LiNiO_2$ material is −50 microns to produce the nano-crystalline lithium nickelate.

54. The method of claim 43, further comprising forming a titania stabilizing coating on the nano-crystalline lithium nickelate.

55. The method of claim 54, comprising forming the titania stabilizing coating by combining the nano-crystalline lithium nickelate with a titania solution.

56. The method of claim 55, where the titania solution comprises at least one of titanium alkoxides, alcohol-soluble organic complexes of titanium, and titanium tetraisopropoxide.

57. The method of claim 55, where the titania solution comprises an alcoholic solvent, where the alcoholic solvent is chosen from secondary alcohols and isopropanol.

58. The method of claim 55, where the titania solution has a titanium concentration in the solvent from 2% to 3% by weight.

59. The method of claim 54, further comprising milling and screening the titania coated nano-crystalline lithium nickelate until substantially all of the titania coated nano-crystalline lithium nickelate passes through a −200-mesh screen.

60. The method of claim 59, further comprising oxidizing the −200-mesh screened titania coated nano-crystalline lithium nickelate by heating the −200-mesh screened titania coated nano-crystalline lithium nickelate under oxygen from 370 degrees Celsius to 450 degrees Celsius for one to three hours; and milling the oxidized material to <30 microns.

61. The method of claim 43, further comprising forming a cathode comprising the nano-crystalline lithium nickelate, a binder, and a metal foil.

62. A cathode electrode comprising the nano-crystalline lithium nickelate of claim 43.

63. A lithium-ion battery comprising the nano-crystalline lithium nickelate of claim 43.

* * * * *